(12) United States Patent
Tsukagoshi et al.

(10) Patent No.: US 7,869,106 B2
(45) Date of Patent: Jan. 11, 2011

(54) HOLOGRAPHIC RECORDING METHOD, HOLOGRAPHIC RECORDING APPARATUS, HOLOGRAPHIC RECORDING AND REPRODUCING METHOD, HOLOGRAPHIC RECORDING AND REPRODUCING APPARATUS, AND HOLOGRAPHIC RECORDING MEDIUM

(75) Inventors: Takuya Tsukagoshi, Sagamihara (JP); Tetsuro Mizushima, Moriguchi (JP); Jiro Yoshinari, Tokyo (JP); Hideaki Miura, Tokyo (JP)

(73) Assignee: TDK Corporation, Tokyo (JP)

( * ) Notice: Subject to any disclaimer, the term of this patent is extended or adjusted under 35 U.S.C. 154(b) by 687 days.

(21) Appl. No.: 11/547,682

(22) PCT Filed: Mar. 29, 2005

(86) PCT No.: PCT/JP2005/005932
§ 371 (c)(1),
(2), (4) Date: Oct. 5, 2006

(87) PCT Pub. No.: WO2005/101137
PCT Pub. Date: Oct. 27, 2005

(65) Prior Publication Data
US 2008/0158628 A1    Jul. 3, 2008

(30) Foreign Application Priority Data
Apr. 15, 2004   (JP)   ............................. 2004-120633

(51) Int. Cl.
*G03H 1/28*   (2006.01)
(52) U.S. Cl. ........................................ 359/24
(58) Field of Classification Search ............. 359/11, 359/24
See application file for complete search history.

(56) References Cited

U.S. PATENT DOCUMENTS 5,404,508 A  *  4/1995  Konrad et al. ............... 707/202
5,777,760 A  *  7/1998  Hays et al. ...................... 359/7

(Continued)

FOREIGN PATENT DOCUMENTS

JP    A 63-306486    12/1988

(Continued)

OTHER PUBLICATIONS

Heanue et al, "Sparse Selection of Reference Beams for Wavelength and Angular Multiplexed Volume Holography," Aug. 1995, Journal of the Optical Society of America A, vol. 12, No. 8, pp. 1671-1676.*

*Primary Examiner*—Alessandro Amari
(74) *Attorney, Agent, or Firm*—Oliff & Berridge, PLC (57) ABSTRACT

A holographic recording method, a holographic recording apparatus, a holographic recording and reproducing method, a holographic recording and reproducing apparatus, and a holographic recording medium for recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, wherein the incidence angle when recording information in the second format of higher angular selectivity can be adjusted to cover an incidence angle that satisfies the Bragg's condition when recording in the first format, thereby ensuring reproduction compatibility between media of different angular selectivities.

16 Claims, 7 Drawing Sheets

U.S. PATENT DOCUMENTS

2002/0114027 A1    8/2002   Horimai
2002/0145773 A1   10/2002   Tanaka et al.
2003/0048494 A1*   3/2003   Ayres et al. .................. 359/10

FOREIGN PATENT DOCUMENTS

JP     A 03-160692    7/1991
JP     A 2002-304109   10/2002
JP     A 2003-178460    6/2003

* cited by examiner

PRIOR ART

HOLOGRAPHIC RECORDING METHOD, HOLOGRAPHIC RECORDING APPARATUS, HOLOGRAPHIC RECORDING AND REPRODUCING METHOD, HOLOGRAPHIC RECORDING AND REPRODUCING APPARATUS, AND HOLOGRAPHIC RECORDING MEDIUM

TECHNICAL FIELD

The present invention relates to a holographic recording method, a holographic recording apparatus, a holographic recording and reproducing method, a holographic recording and reproducing apparatus, and a holographic recording medium.

BACKGROUND ART

Figure 10:
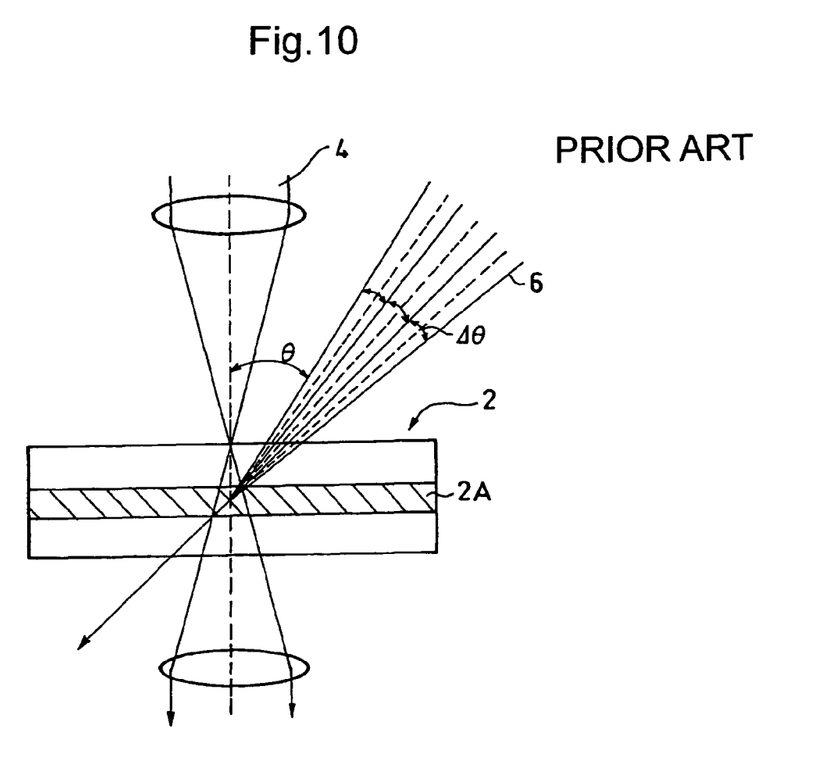
FIG. 10 is a side view schematically showing the relationship between a recording layer, reference light, and signal light in a conventional holographic recording apparatus.

As shown in FIG. 10, among the holographic recording methods proposed heretofore is a holographic recording method in which either one of signal light 4 and reference light 6 branched out from a laser light source is made to cross the other in a recording layer 2A of a holographic recording medium 2 at a predetermined incidence angle $\theta$, and the incidence angle $\theta$ is changed at a predetermined angular pitch $\Delta\theta$ so that information is recorded in an angle multiplex fashion as a hologram (for example, see Japanese Patent Laid-Open Publication No. 2003-178460).

Figure 11:
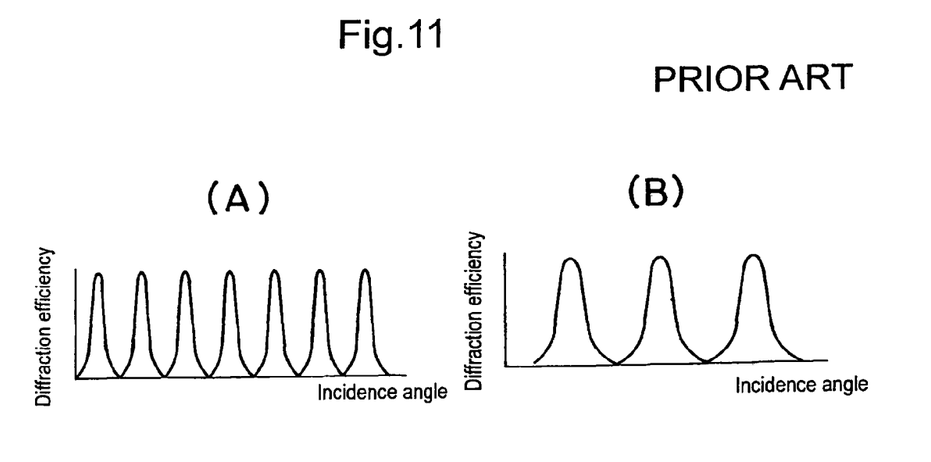
FIG. 11 is a graph for showing the angular selectivities of holographic recording media having recording layers of different thicknesses.

By the way, in order to improve the recording density of the holographic recording medium 2 like this, it is important to "increase the thickness of the recording layer." In general, the thicker the recording layer 2A of the holographic recording medium 2 is, the narrower the ranges of the incidence angles to satisfy the Bragg's condition becomes and the more the angular selectivity improves. Specifically, as shown in FIGS. 11(A) and 11(B), the relationship between the incidence angle of the reference light 6 and the diffraction efficiency, i.e., the angular selectivity varies with the thickness of the recording layer 2A. As compared to the medium having a thinner recording layer 2A shown in FIG. 11(B), the medium having a thicker recording layer 2A shown in FIG. 11(A) has narrower ranges of the incidence angles of the reference light 6 to satisfy the Bragg's condition, and has higher angular selectivity.

As above, the thickness of the recording layer 2A can be increased to improve the angular selectivity for the purpose of increased recording multiplicity and improved recording density. In recent years, demands for the holographic recording medium 2 to have higher recording capacities have been growing increasingly, and it is expected that the recording layer 2A will be thickened rapidly in the future.

Nevertheless, simply thickening the recording layer 2A has the problem that it is impossible to ensure reproduction compatibility between media that have recording layers 2A of different thicknesses (different angular selectivities) since the condition as to the incidence angle varies from one medium to another.

DISCLOSURE OF THE INVENTION

The present invention has been devised in order to solve such a problem, and it is an object of the present invention to provide a holographic recording method, a holographic recording apparatus, a holographic recording and reproducing method, a holographic recording and reproducing apparatus, and a holographic recording medium which can ensure reproduction compatibility between media of different angular selectivities.

As a result of intensive studies, the inventor of the present invention has found a holographic recording method, a holographic recording apparatus, a holographic recording and reproducing method, a holographic recording and reproducing apparatus, and a holographic recording medium which can ensure the reproduction compatibility between media of different angular selectivities.

In summary, the above-described objectives are achieved by the following embodiments of the present invention.

(1) A holographic recording method for recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, wherein the incidence angle when recording information in the second format of higher angular selectivity can be adjusted to cover an incidence angle that satisfies the Bragg's condition when recording in the first format.

(2) The holographic recording method according to (1), wherein an angular pitch of the second format during recording is set to $\Delta\theta/n$ (n is an integer not smaller than 2), where $\Delta\theta$ is an angular pitch of the first format during recording.

(3) The holographic recording method according to (1), wherein the first format has a plurality of kinds of angular pitches during recording, and an angular pitch of the second format during recording covers an angular pitch consisting of a divisor of the angular pitches of the first format.

(4) The holographic recording method according to (3), wherein the divisor is the greatest common divisor.

(5) The holographic recording method according to (1), wherein identical information is recorded in a multiplex fashion at a plurality of incidence angles near an incidence angle common to the second format and the first format.

(6) The holographic recording method according to any one of (1) to (5), wherein control information pertaining to the angular selectivity, including at least information on the incidence angle and wavelength of reproduction light, is recorded at an incidence angle common to the second format and the first format.

(7) A holographic recording apparatus capable of recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, the apparatus comprising a signal optical system and a reference optical system capable of adjusting the incidence angle when recording information in the second format of higher angular selectivity so as to cover an incidence angle that satisfies the Bragg's condition when recording in the first format.

(8) The holographic recording apparatus according to (7), wherein an angular pitch of the second format during recording is set to $\Delta\theta/n$ (n is an integer not smaller than 2), where $\Delta\theta$ is an angular pitch of the first format during recording.

(9) The holographic recording apparatus according to (7), wherein the first format has a plurality of kinds of angular pitches during recording, and an angular pitch of the second format during recording covers an angular pitch consisting of a divisor of the angular pitches of the first format.

(10) The holographic recording apparatus according to (9), wherein the divisor is the greatest common divisor.

(11) The holographic recording apparatus according to (7), wherein identical information can be recorded in a multiplex fashion at a plurality of incidence angles near an incidence angle common to the second format and the first format.

(12) The holographic recording apparatus according to any one of (7) to (11), wherein control information pertaining to the angular selectivity, including at least information on the incidence angle and wavelength of reproduction light, can be recorded at an incidence angle common to the second format and the first format.

(13) A holographic recording and reproducing method for recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, and for reproducing the recorded information by irradiation of reproduction light consisting of either one of the signal light and the reference light, wherein the incidence angle when recording information in the second format of higher angular selectivity can be adjusted to cover an incidence angle that satisfies the Bragg's condition when recording in the first format, the method comprising the processes of: recording control information pertaining to the angular selectivity, including at least information on the incidence angle and wavelength of the reproduction light, at an incidence angle common to the second format and the first format; and acquiring the control information before reproducing information other than the control information.

(14) The holographic recording and reproducing method according to (13), wherein the control information is acquired by associative reproduction.

(15) A holographic recording and reproducing apparatus capable of recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, and capable of reproducing the recorded information by irradiation of reproduction light consisting of either one of the signal light and the reference light, the apparatus comprising: a signal optical system and a reference optical system capable of adjusting the incidence angle when recording information in the second format of higher angular selectivity so as to cover an incidence angle that satisfies the Bragg's condition when recording in the first format, and capable of recording control information pertaining to the angular selectivity, including at least information on the incidence angle and wavelength of the reproduction light, at an incidence angle common to the second format and the first format; and a detection optical system capable of acquiring the control information before reproducing information other than the control information.

(16) The holographic recording and reproducing apparatus according to (15), wherein the control information can be acquired by associative reproduction.

(17) A holographic recording medium containing information recorded in an angle multiplex fashion as a hologram in a first format in which either one of signal light and reference light branched out from a laser light source is made to cross the other in its recording layer at a predetermined incidence angle and the incidence angle is changed at a predetermined angular pitch, or in a second format of higher angular selectivity, wherein the information is recorded at incidence angles including at least an incidence angle common to the second format and the first format.

(18) The holographic recording medium according to (17), wherein the information is recorded in an angular pitch $\Delta\theta/n$ (n is an integer not smaller than 2), where $\Delta\theta$ is an angular pitch of the first format during recording.

(19) The holographic recording medium according to (17), wherein the first format has a plurality of kinds of angular pitches during recording, and the information is recorded in an angular pitch consisting of a divisor of the angular pitches of the first format.

(20) The holographic recording medium according to (19), wherein the divisor is the greatest common divisor.

(21) The holographic recording medium according to (17), wherein identical information is recorded in a multiplex fashion at a plurality of incidence angles near an incidence angle common to the second format and the first format.

(22) The holographic recording medium according to any one of (17) to (21), wherein control information pertaining to the angular selectivity, including at least information on the incidence angle and wavelength of reproduction light, is recorded at an incidence angle common to the second format and the first format.

BEST MODE FOR CARRYING OUT THE INVENTION

The holographic recording method according to the present invention is a holographic recording method for recording information in an angle multiplex fashion as a hologram in a first format in which either one of signal light and reference light branched out from a laser light source is made to cross the other in a recording layer at a predetermined incidence angle and the incidence angle is changed at a predetermined angular pitch, or in a second format of higher angular selectivity, wherein the incidence angle when recording information in the second format of higher angular selectivity can be adjusted to cover an incidence angle that satisfies the Bragg's condition when recording in the first format, thereby solving the foregoing problem.

It should be noted that the "format" according to the present invention means both a physical format for defining the recording capacity, modulation scheme, error-correcting code system, and the like of a recording medium and a logical format for defining the recording and reproducing method and the like. For example, DVD-Video format, DVD-Audio format, and the like of DVD (Digital Versatile Disc) apply thereto.

Moreover, the "first format" and the "second format" according to the present invention refer to ones that are different from each other in angular selectivity alone but are identical in the rest of the physical format and the logical format.

In the following embodiments, the first format having a lower angular selectivity will be referred to as "lower format," and the second format having a higher angular selectivity as "upper format."

First Embodiment

Figure 1:
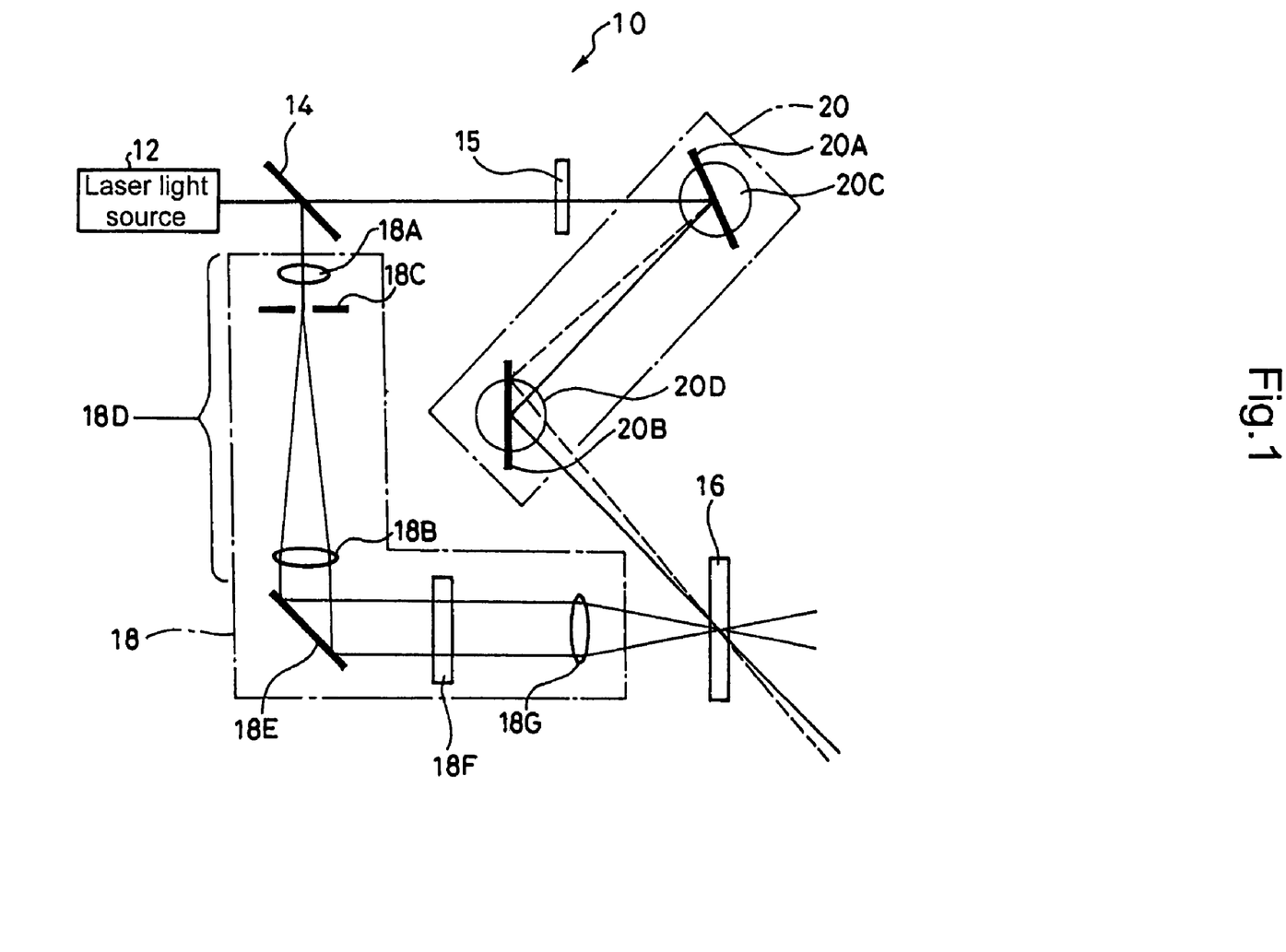
FIG. 1 is an optical system diagram of a holographic recording apparatus according to a first embodiment of the present invention.

Hereinafter, with reference to FIG. 1, description will be given of a holographic recording apparatus 10 to which a holographic recording method according to a first embodiment of the present invention is applied.

This holographic recording apparatus 10 is configured to include: a laser light source 12; a polarizing beam splitter 14 for transmitting either one of linearly-polarized beams of laser light from this laser light source 12 which have orthogonal planes of vibration, such as a p-polarized component, and reflecting an s-polarized component; a signal optical system 18 for introducing the s-polarized signal light reflected from this polarizing beam splitter 14 to a holographic recording medium 16; and a reference optical system 20 for introducing s-polarized reference light to the holographic recording medium 16, the reference light being transmitted through the polarizing beam splitter 14 as p-polarized before its plane of vibration is rotated generally 90° by a half-wave plate 15.

The signal optical system 18 is configured to include: a beam expander 18D for expanding the beam diameter of the signal light emitted from the laser light source 12, consisting of two first and second lenses 18A and 18B and a pin hole 18C; a mirror 18E for reflecting the signal light past this beam expander 18D at a right angle; a spatial light modulator (hereinafter, SLM) 18F on which the signal light reflected from the mirror 18E is incident; and a Fourier lens 18G for condensing the signal light past this SLM 18F to inside the holographic recording medium 16. It should be appreciated that the beam expander 18D constitutes a relay optical system since the first and second lenses 18A and 18B are placed at a distance generally equal to the sum of their respective focal lengths, and also has the function of a spatial filter since the pin hole 18C is arranged near the common focus of this relay optical system.

The reference optical system 20 is configured to include two rotary mirrors 20A and 20B for reflecting the reference light incident from the polarizing beam splitter 14 toward the holographic recording medium 16. It should be appreciated that the rotary mirrors 20A and 20B are supported by rotary stages 20C and 20D so that they can be adjusted in the angle of reflection. This makes the reference optical system 20 capable of modulating the incidence angle of the reference light on the holographic recording medium 16. That is, this allows angle multiplex recording.

Next, description will be given of the basic principle for recording information on the holographic recording medium 16 by this holographic recording apparatus 10.

The signal light incident on the signal optical system 18 is expanded in beam diameter by the beam expander 18B before it is reflected by the mirror 18E, given data in the form of intensity modulation by the SLM 18F, and then condensed and Fourier-transformed in the intensity distribution by the Fourier lens 18G to irradiate the holographic recording medium 16 with.

Meanwhile, the reference light incident on the reference optical system 20 is reflected by the two rotary mirrors 20A and 20B at predetermined angles, and then crosses the irradiating signal light in the holographic recording medium 16.

These signal light and reference light cause optical interference in the area where the two cross each other. This is recorded as a diffraction grating on the holographic recording medium 16.

More specifically, a plurality of pieces of information are recorded on the holographic recording medium 16 in an angle multiplex fashion through the process to be described below.

Figure 2:
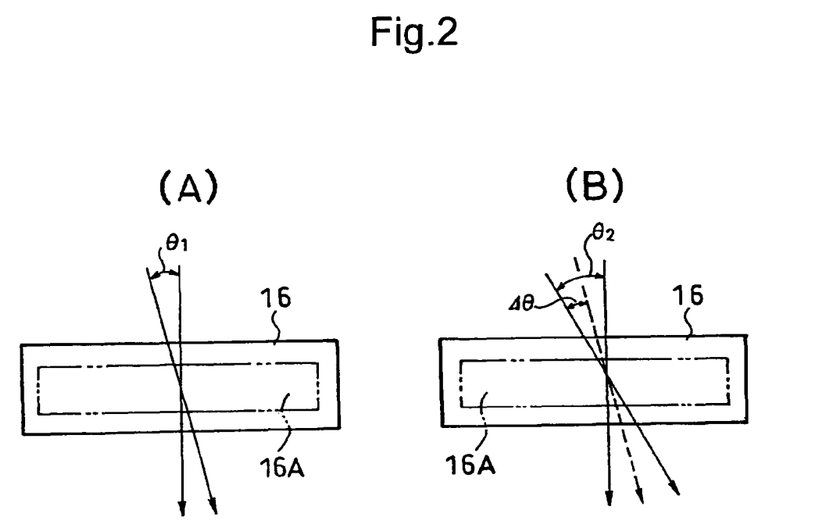
FIG. 2 is a side view schematically showing the relationship between a recording layer, reference light, and signal light in the holographic recording apparatus.

Initially, as shown in FIG. 2(A), the holographic recording medium 16 is irradiated with the signal light from a direction orthogonal to the surface and with the reference light at an angle of $\theta_1$ with respect to this signal light to form interference fringes therebetween.

Next, as shown in FIG. 2(B), the incidence angle of the signal light is kept constant while the incidence angle $\theta_1$ of the reference light is changed by an angular pitch $\Delta\theta$, whereby angle multiplex recording is performed on the recording layer 16A of the holographic recording medium 16 with the incidence angle of $\theta_2$ ($=\theta_1+\Delta\theta$). In this way, the incidence angle of the reference light is changed at the angular pitch of $\Delta\theta$ while a required number of pieces of information are recorded in an angle multiplex fashion. Note that the angular pitch $\Delta\theta$ is set to be greater than the range of the incidence angles that allow reproduction of a hologram (satisfy the Bragg's condition), so as to avoid crosstalk between the individual pieces of information (holograms).

Figure 3:
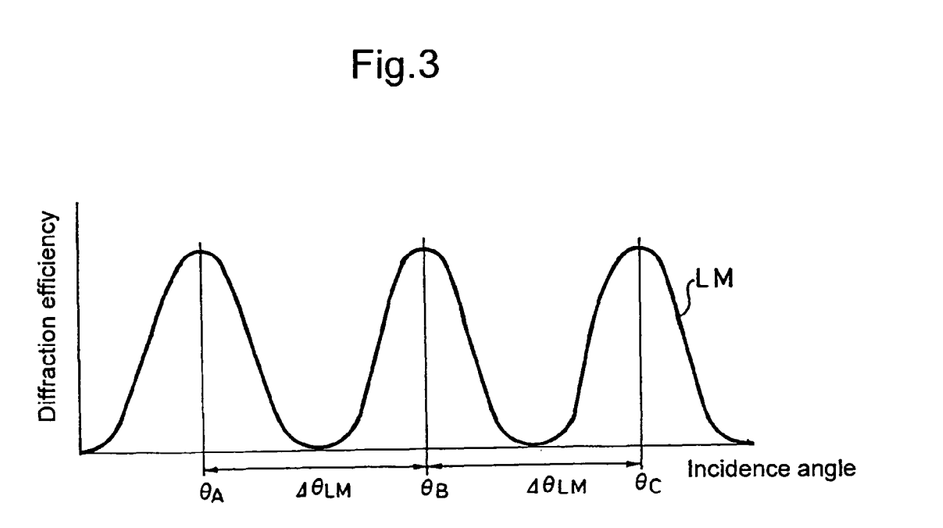
FIG. 3 is a graph for showing the angular selectivity of a lower format medium according to the first embodiment of the present invention.

Next, description will be given of the process by which this holographic recording apparatus 10 records information on the holographic recording medium 16. It should be noted that the first embodiment will be described on the assumption that a holographic recording medium of lower format (hereinafter, referred to simply as "lower format medium") LM has angular selectivity such that the diffraction efficiency peaks when the incidence angle of the reference light is $\theta_A$, $\theta_B$, and $\theta_C$ as shown in FIG. 3.

Figure 4:
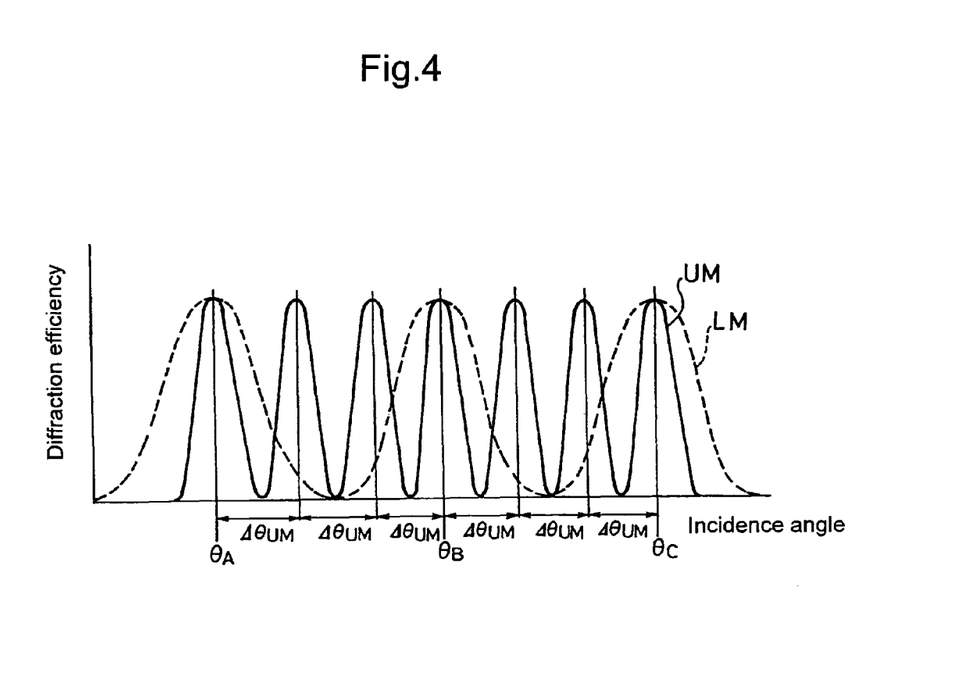
FIG. 4 is a graph for showing the angular selectivities of an upper format medium and a lower format medium according to the first embodiment of the present invention.
Figure 5:
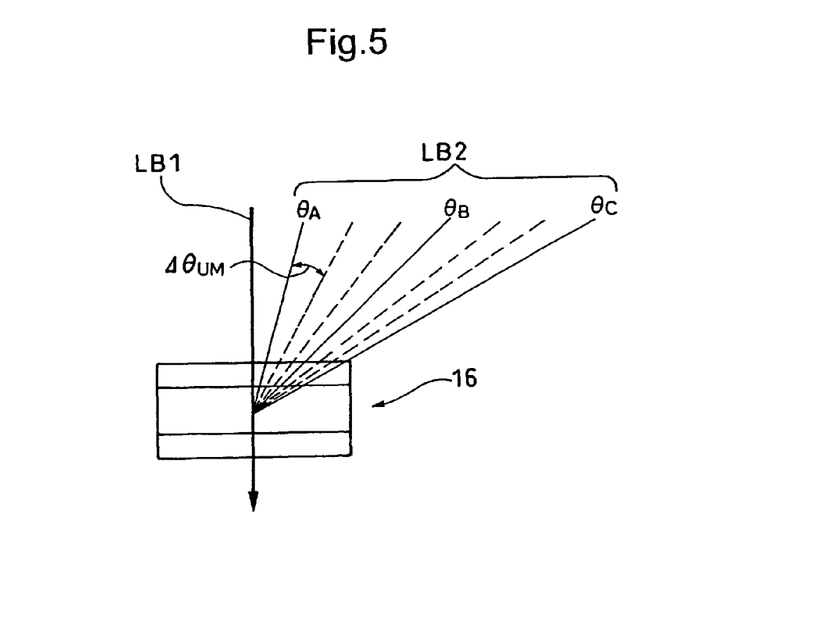
FIG. 5 is a schematic diagram showing the state of angle multiplex recording of the holographic recording apparatus according to the first embodiment of the present invention.

When recording information on a holographic recording medium of upper format (hereinafter, referred to simply as "upper format medium") UM which has angular selectivity higher than that of this lower format medium LM, the information is recorded while the incidence angle of the reference light is adjusted to cover the incidence angles $\theta_A$, $\theta_B$, and $\theta_C$ which satisfy the Bragg's condition during recording in the lower format as shown in FIGS. 4 and 5.

Moreover, the angular pitch $\Delta\theta_{UM}$ of the upper format medium UM during recording is set to $\Delta\theta_{LM}/3$, where $\Delta\theta_{LM}$ is the angular pitch of the incidence angle of the lower format medium LM during recording.

In the first embodiment, the angular pitch $\Delta\theta_{UM}$ of the upper format medium UM during recording is set to one third of the angular pitch $\Delta\theta_{LM}$ of the lower format medium LM during recording. However, the present invention is not limited thereto. The angular pitch of the upper format during recording is preferably set to $\Delta\theta/n$ (n is an integer not smaller than 2), where $\Delta\theta$ is the angular pitch of the lower format during recording.

Moreover, in the holographic recording apparatus 10 according to the first embodiment, format information (control information) pertaining to the angular selectivity, including information on the incidence angle and wavelength of reproduction light, is recorded at the angles of incidence $\theta_A$, $\theta_B$, and $\theta_C$ which are common to the upper format medium UM and the lower format medium LM.

In the holographic recording method according to the first embodiment, the incidence angle when recording information in the upper format (the second format) of higher angular selectivity can be adjusted to cover the angles of incidence $\theta_A$, $\theta_B$, and $\theta_C$ that satisfy the Bragg's condition during recording in the lower format (the first format). This makes it possible to ensure reproduction compatibility between the media of different angular selectivities.

In particular, the angular pitch of the upper format during recording is set to $\Delta\theta/n$ (n is an integer not smaller than 2), where $\Delta\theta$ is the angular pitch of the lower format during recording. This facilitates controlling the incidence angle when the (upper) holographic recording apparatus capable of reproducing the upper format medium UM performs recording on the lower format medium LM.

Moreover, the format information (control information) pertaining to the angular selectivity, including at least information on the incidence angle and wavelength of the reproduction light, is recorded at the incidence angles $\theta_A$, $\theta_B$, and $\theta_C$ which are common to the upper format medium UM and the lower format medium LM. This can ensure the compatibility of the control information between the upper format medium UM and the lower format medium LM, and facilitate control during reproduction because of such information as the incidence angle and wavelength of the reproduction light.

It should be appreciated that the holographic recording method according to the present invention is not limited to the holographic recording method according to the first embodiment.

Figure 6:
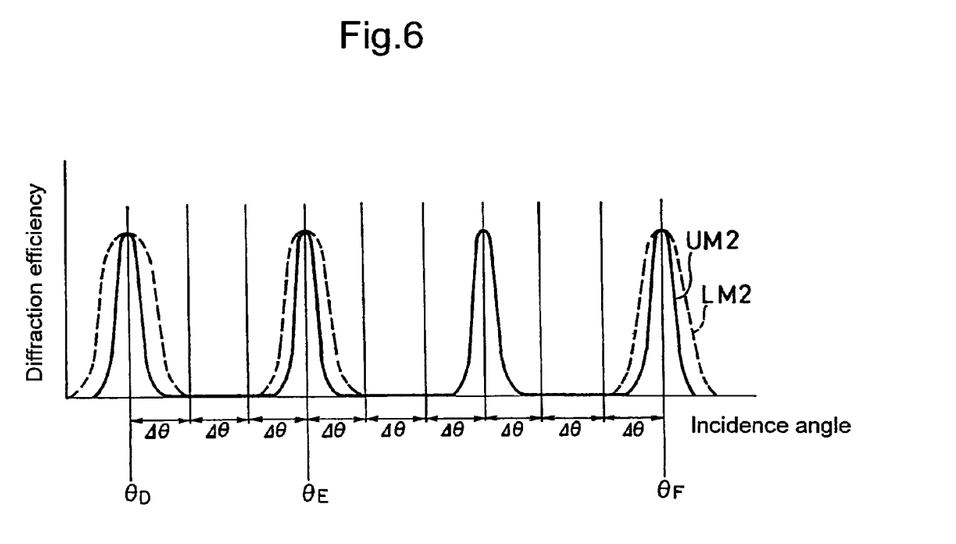
FIG. 6 is a graph for showing the angular selectivities of an upper format medium and a lower format media having different angular pitches.

For example, when a lower format medium LM2 has a plurality of kinds of angular pitches as shown in FIG. 6 (in this example, two kinds, i.e., an angular pitch $\theta_{LM}$ of $3\Delta\theta$ between the angles of incidence $\theta_D$ and $\theta_E$ and an angular pitch $\theta_{LM}$ of $6\Delta\theta$ between the angles of incidence $\theta_E$ and $\theta_F$), an upper format medium UM2 therefore preferably has an angular pitch $\theta_{UM}$ that is a divisor of the angular pitches $\theta_{LM}$ ($3\Delta\theta$ and $6\Delta\theta$) of the lower format medium LM2, i.e., an angular pitch that covers $3\Delta\theta$ or $\Delta\theta$. Between the divisors $3\Delta\theta$ and $\Delta\theta$, the greatest common divisor $3\Delta\theta$ is preferred in particular.

As above, when the lower format has a plurality of kinds of angular pitches for recording, the angular pitch of the upper format may cover an angular pitch that consists of a divisor of the angular pitches of the lower format so that reproduction compatibility is ensured between the media of different angular selectivities. In particular, if the divisor is the greatest common divisor, the large angular pitch can facilitate the control on the incidence angle accordingly.

Figure 7:
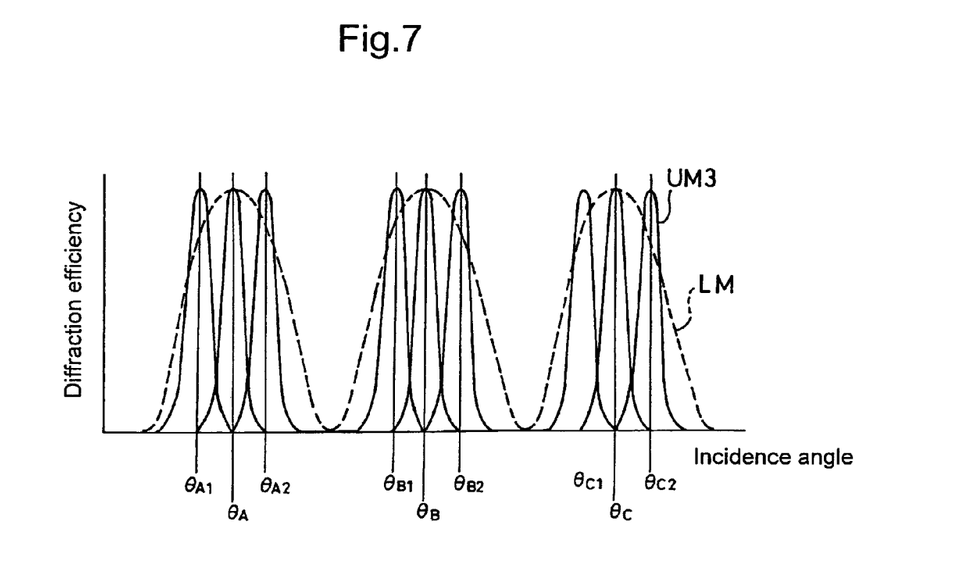
FIG. 7 is a graph for explaining another recording method of the holographic recording apparatus according to the first embodiment of the present invention.
Figure 8:
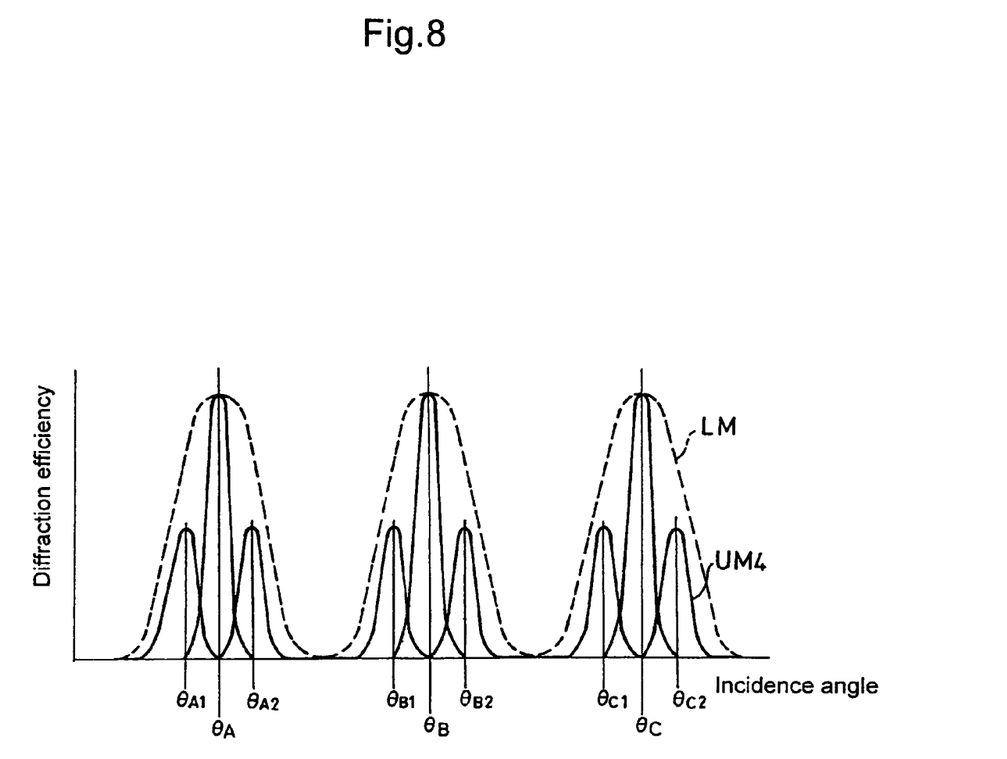
FIG. 8 is a graph for explaining yet another recording method of the holographic recording apparatus according to the first embodiment of the present invention.

Furthermore, as shown in FIGS. 7 and 8, when identical information is recorded in a multiple fashion at a plurality of angles of incidence $\theta_{A1}$ and $\theta_{A2}$ ($\theta_{B1}$ and $\theta_{B2}$, $\theta_{C1}$ and $\theta_{C2}$) near an incidence angle $\theta_A$ ($\theta_B$, $\theta_C$) that is common to an upper format medium UM3 (UM4) and the lower format medium LM, it is possible to reproduce the information recorded on the upper format medium UM3 (UM4) even if the incidence angle on the lower format medium LM undergoes some errors during reproduction.

Second Embodiment

Figure 9:
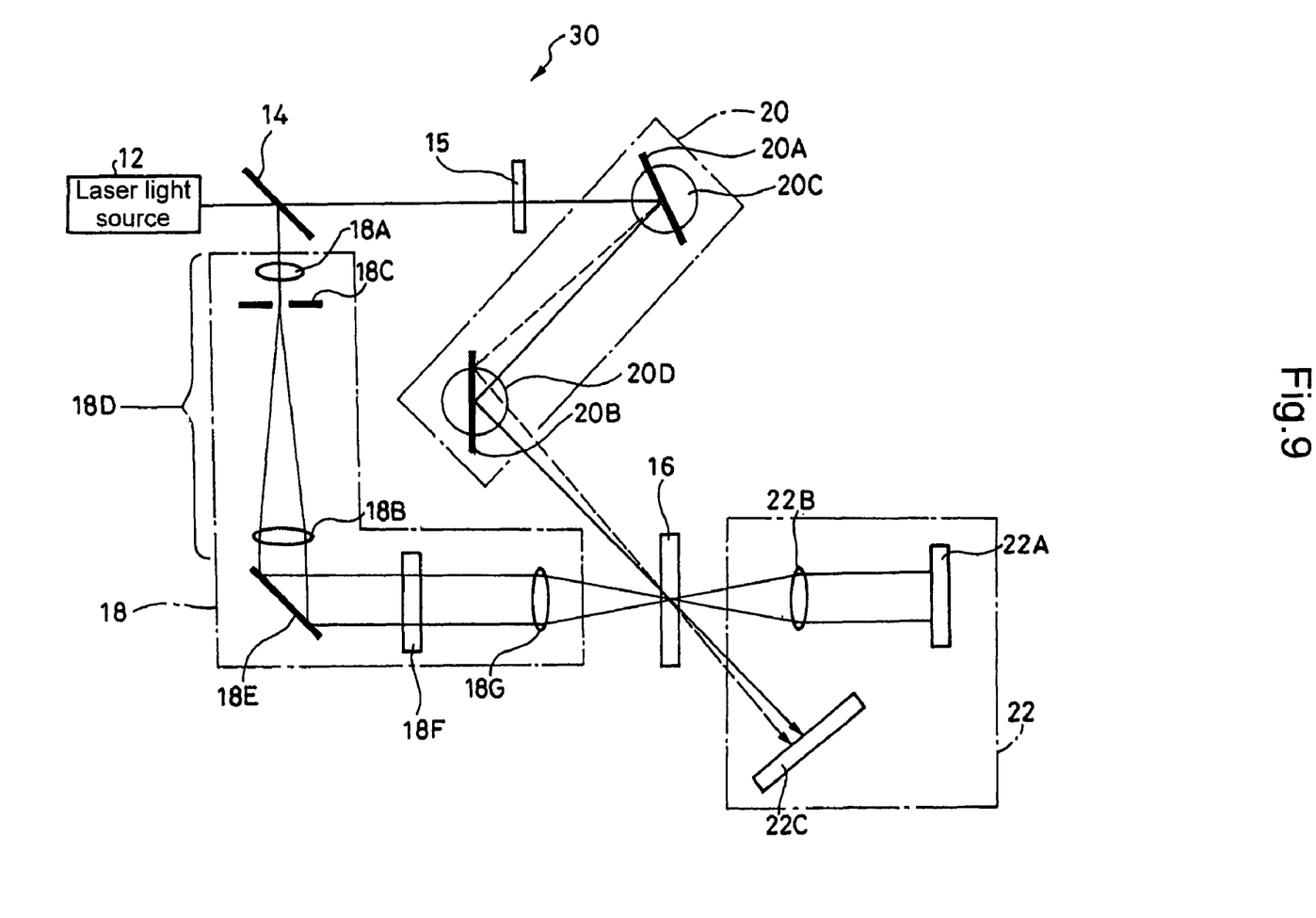
FIG. 9 is an optical system diagram of a holographic recording and reproducing apparatus according to a second embodiment of the present invention.

Next, with reference to FIG. 9, description will be given of a holographic recording and reproducing apparatus 30 to which a holographic recording and reproducing method according to a second embodiment of the present invention is applied.

The holographic recording and reproducing apparatus 30 according to the second embodiment is the holographic recording apparatus 10 of the foregoing first embodiment to which a detection optical system 22 is added.

This detection optical system 22 is configured to include: an image pickup device 22A and an imaging lens 22B for detecting diffracted light occurring when the holographic recording medium 16 is irradiated with reference light; and an address information detector 22C for detecting angle multiplexed diffracted light occurring when the holographic recording medium 16 is irradiated with signal light. It should be appreciated that the address information detector 22C may be made of a CCD camera or the like, for example.

To reproduce information from the holographic recording medium 16 that is recorded as in the foregoing first embodiment, the optical path of the signal optical system 18 is interrupted so that the holographic recording medium 16 is irradiated with the reference light alone. Here, if a hologram to be reproduced is irradiated with the reference light under a corresponding condition on the incidence angle, signal light is emitted as diffracted light. The intended information can thus be reproduced by detecting this emitted signal light with the image pickup device 22A through the imaging lens 22B.

Meanwhile, when the optical path of the reference optical system 20 is interrupted to irradiate the holographic recording medium 16 with the signal light alone, all the beams of reference light recorded in an angle multiplex fashion are emitted simultaneously as diffracted light. The intended information recorded in an angle multiplex fashion can thus be reproduced by detecting this emitted reference light with the address information detector 22C. As employed in the present invention, the reproduction of such reference light recorded in an angle multiplex fashion will be referred to as "associative reproduction." According to this "associative reproduction," it is possible to achieve an ultrahigh-speed search function for retrieving specific data instantaneously. The holographic recording and reproducing apparatus 30 according to the second embodiment acquires format information recorded on the holographic recording medium 16 by this associative reproduction.

Next, description will be given of the process by which this holographic recording apparatus 30 reproduces information from the holographic recording medium 16.

When the holographic recording medium 16 is loaded on the holographic recording and reproducing apparatus 30 and becomes ready for reproduction, format information which contains such information as the incidence angle and wavelength of the reproduction light is initially acquired by associative reproduction. Then, reproduction control is performed based on this format information, and information other than the format information is reproduced successively.

In the holographic recording and reproducing method according to the present second embodiment, the incidence angle when recording information in the upper format (the second format) of higher angular selectivity can be adjusted to cover the incidence angles of that satisfy the Bragg's condition during recording in the lower format (the first format). This includes the processes of: recording format information (control information) pertaining to the angular selectivity, including at least the information on the incidence angle and wavelength of the reproduction light, at the angles of incidence common to the upper format (the second format) and the lower format (the first format); and acquiring the format information before reproducing information other than the format information. It is therefore possible to exercise more sophisticated control during reproduction.

In particular, since the format information (control information) is acquired by associative reproduction, it is possible to acquire the control information quickly and reduce the time to start reproduction significantly.

It should be appreciated that the holographic recording apparatus and the holographic recording and reproduction apparatus of the present invention are not limited to the structures and the like of the holographic recording apparatus 10 and the holographic recording and reproducing apparatus 30 according to the foregoing embodiments 1 and 2.

Thus, for example, the incidence angle of the reference light may be kept constant while the incidence angle of the signal light is changed at predetermined angular pitches so as to perform angle multiplex recording on the recording layer of the holographic recording medium.

INDUSTRIAL APPLICABILITY

According to the holographic recording method, the holographic recording apparatus, the holographic recording and reproducing method, the holographic recording and reproducing apparatus, and the holographic recording medium of the present invention, it is possible to ensure reproduction compatibility between media of different angular selectivities.

The invention claimed is:

1. A holographic recording method for recording information in an angle multiplex fashion as a hologram, comprising:
    branching out signal light and reference light from a laser light source;
    crossing either one of the signal light and the reference light to the other in a recording layer of an optical recording medium at a predetermined incidence angle;
    changing the incidence angle at a predetermined angular pitch in a first format; and
    changing the incidence angle in a second format of higher angular selectivity for another optical recording medium,
    wherein the incidence angle when recording information in the second format of higher angular selectivity is adjusted to cover the predetermined incidence angle and an incidence angle that satisfies the Bragg's condition when recording in the first format, and an angular pitch of the second format during recording is set to $\Delta\theta/n$ (n is an integer not smaller than 2), where $\Delta\theta$ is an angular pitch of the first format during recording, and substantially identical information is recorded in a multiplex fashion at two incidence angles near to both sides of an incidence angle common to the second format and the first format.

2. The holographic recording method according to claim 1, wherein
    the first format has a plurality of kinds of angular pitches during recording, and an angular pitch of the second format during recording covers an angular pitch consisting of a divisor of the angular pitches of the first format.

3. The holographic recording method according to claim 2, wherein the divisor is the greatest common divisor.

4. The holographic recording method according to of claim 1, wherein
    control information pertaining to the angular selectivity, including at least information on the incidence angle and wavelength of reproduction light, is recorded at an incidence angle common to the second format and the first format.

5. A holographic recording apparatus capable of recording information in an angle multiplex fashion as a hologram of an optical recording medium in a first format in which either one of signal light and reference light branched out from a laser light source is made to cross the other in a recording layer at a predetermined incidence angle and the incidence angle is changed at a predetermined angular pitch, or in a second format of higher angular selectivity for another optical recording medium, the apparatus comprising a signal optical system and a reference optical system capable of adjusting the incidence angle when recording information in the second format of higher angular selectivity so as to cover an incidence angle that satisfies the Bragg's condition when recording in the first format, and an angular pitch of the second format during recording is set to $\Delta\theta/n$ (n is an integer not smaller than 2), where $\Delta\theta$ is an angular pitch of the first format during recording, and substantially identical information is recorded in a multiplex fashion at two incidence angles near to both sides of an incidence angle common to the second format and the first format.

6. The holographic recording apparatus according to claim 5, wherein the first format has a plurality of kinds of angular pitches during recording, and an angular pitch of the second format during recording covers an angular pitch consisting of a divisor of the angular pitches of the first format.

7. The holographic recording apparatus according to claim 6, wherein
    the divisor is the greatest common divisor.

8. The holographic recording apparatus according to claim 5, wherein
    control information pertaining to the angular selectivity, including at least information on the incidence angle and wavelength of reproduction light, can be recorded at an incidence angle common to the second format and the first format.

9. A holographic recording and reproducing method for recording information in an angle multiplex fashion as a hologram, comprising:
    branching out signal light and reference light from a laser light source;
    crossing either one of the signal light and the reference light to the other in a recording layer of an optical recording medium at a predetermined incidence angle;
    changing the incidence angle at a predetermined angular pitch in a first format; and
    changing the incidence angle in a second format of higher angular selectivity for another optical recording medium, and for reproducing the recorded information by irradiation of reproduction light consisting of either one of the signal light and the reference light, wherein the incidence angle when recording information in the second format of higher angular selectivity is adjusted to cover the predetermined incidence angle and an incidence angle that satisfies the Bragg's condition when recording in the first format, and substantially identical information is recorded in a multiplex fashion at two incidence angles near to both sides of an incidence angle common to the second format and the first format, the method comprising the processes of: recording control information pertaining to the angular selectivity, including at least information on the incidence angle and wavelength of the reproduction light, at an incidence angle common to the second format and the first format; and acquiring the control information before reproducing information other than the control information.

10. The holographic recording and reproducing method according to claim 9, wherein the control information is acquired by associative reproduction.

11. A holographic recording and reproducing apparatus capable of recording information in an angle multiplex fashion as a hologram of an optical recording medium in a first format in which either one of signal light and reference light branched out from a laser light source is made to cross the other in a recording layer at a predetermined incidence angle and the incidence angle is changed at a predetermined angular pitch, or in a second format of higher angular selectivity for another optical recording medium, and capable of reproducing the recorded information by irradiation of reproduction light consisting of either one of the signal light and the reference light, the apparatus comprising: a signal optical system and a reference optical system adjusting the incidence angle when recording information in the second format of higher angular selectivity so as to cover the predetermined incidence angle and an incidence angle that satisfies the Bragg's condition when recording in the first format, and capable of recording control information pertaining to the angular selectivity, including at least information on the incidence angle and wavelength of the reproduction light, at an incidence angle common to the second format and the first format; and a detection optical system capable of acquiring the control information before reproducing information other than the control information, wherein the signal optical system and a reference optical system are capable of recording substantially identical information in a multiplex fashion at two incidence angles near to both sides of an incidence angle in common to the second format and the first format and at the incidence angle in the first format.

12. The holographic recording and reproducing apparatus according to claim 11, wherein the control information can be acquired by associative reproduction.

13. A holographic recording medium containing information recorded in an angle multiplex fashion as a hologram in a first format in which either one of signal light and reference light branched out from a laser light source is made to cross the other in its recording layer at a predetermined incidence angle and the incidence angle is changed at a predetermined angular pitch, or in a second format of higher angular selectivity, wherein the information is recorded at incidence angles including at least an incidence angle common to the second format and the first format, and the information is recorded in an angular pitch $\Delta\theta/n$ (n is an integer not smaller than 2), where $\Delta\theta$ is an angular pitch of the first format during recording, and substantially identical information is recorded in a multiplex fashion at two incidence angles near to both sides of an incidence angle common to the second format and the first format.

14. The holographic recording medium according to claim 13, wherein the first format has a plurality of kinds of angular pitches during recording, and the information is recorded in an angular pitch consisting of a divisor of the angular pitches of the first format.

15. The holographic recording medium according to claim 14, wherein the divisor is the greatest common divisor.

16. The holographic recording medium according to claim 13, wherein control information pertaining to the angular selectivity, including at least information on the incidence angle and wavelength of reproduction light, is recorded at an incidence angle common to the second format and the first format.

* * * * *